United States Patent [19]

Matsushima et al.

[11] Patent Number: 4,821,115
[45] Date of Patent: Apr. 11, 1989

[54] COLOR HARD COPY APPARATUS HAVING SIMPLIFIED ANALOG-TO-DIGITAL CONVERSION WITH ADJUSTABLE THRESHOLD LEVELS

[75] Inventors: Kenichi Matsushima; Fumihiro Tanaka; Kaneo Yamaguchi; Yoshio Shimada; Shinya Watanabe, all of Tokyo, Japan

[73] Assignee: Seiko Instruments & Electronics Ltd., Tokyo, Japan

[21] Appl. No.: 913,684

[22] Filed: Sep. 30, 1986

[30] Foreign Application Priority Data

Oct. 1, 1985 [JP] Japan ................................ 60-218233

[51] Int. Cl.$^4$ ............................................. H04N 1/46
[52] U.S. Cl. ......................................... 358/75; 358/78
[58] Field of Search ............................ 358/75, 283, 78

[56] References Cited

U.S. PATENT DOCUMENTS

| 4,214,277 | 7/1980 | Urich | 358/283 |
|---|---|---|---|
| 4,238,768 | 12/1980 | Mitsuya et al. | 358/283 |
| 4,449,150 | 5/1984 | Kato | 358/283 |
| 4,475,127 | 10/1984 | Iinuma | 358/283 |
| 4,485,408 | 11/1984 | Kamizyo et al. | 358/283 |
| 4,495,522 | 1/1985 | Matsunawa et al. | 358/283 |
| 4,496,987 | 1/1985 | Yuasa et al. | 358/283 |
| 4,504,115 | 3/1985 | Ogawa et al. | 358/283 |
| 4,553,173 | 11/1985 | Kawamura | 358/283 |
| 4,554,594 | 11/1985 | Ciardiello et al. | 358/283 |
| 4,556,918 | 12/1985 | Yamazaki et al. | 358/283 |

Primary Examiner—James J. Groody
Assistant Examiner—Robert M. Bauer
Attorney, Agent, or Firm—Bruce L. Adams; Van C. Wilks

[57] ABSTRACT

A color hard copy apparatus converts an analog video signal of a still picture frame displayed on a color graphic display into binary video data to obtain a multicolor gradation picture. A single analog-to-digital converter samples the analog video signal a plurality of times at respectively different threshold levels, each threshold level being maintained constant during the sampling of the entire picture frame, to convert the analog video signal into corresponding binary video data. The binary video data are written in a picture memory at predetermined write-in addresses according to a predetermined multicolor gradation picture program, such as an organized dither program or a density pattern, and the binary video data are read out of the picture memory according to the predetermined multicolor gradation picture program to obtain binary picture data signals for use in printing a high-quality multicolor gradation picture corresponding to the desired picture frame displayed on the color graphic display.

5 Claims, 8 Drawing Sheets

| ADDRESS | DATA | |
|---------|------|---|
| 0000 | 1 | ⎫ THRESHOLD VOLTAGE a |
| 0001 | 1 | |
| 0010 | 1 | |
| 0011 | 1 | ⎭ |
| 0100 | 0 | ⎫ THRESHOLD VOLTAGE c |
| 0101 | 1 | |
| 0110 | 1 | |
| 0111 | 0 | ⎭ |
| 1000 | 0 | ⎫ THRESHOLD VOLTAGE d |
| 1001 | 1 | |
| 1010 | 0 | |
| 1011 | 0 | ⎭ |
| 1100 | 0 | ⎫ THRESHOLD VOLTAGE b |
| 1101 | 1 | |
| 1110 | 1 | |
| 1111 | 1 | ⎭ |

PICTURE CELL A, PICTURE CELL B, PICTURE CELL C, PICTURE CELL D

HORIZONTAL, VERTICAL

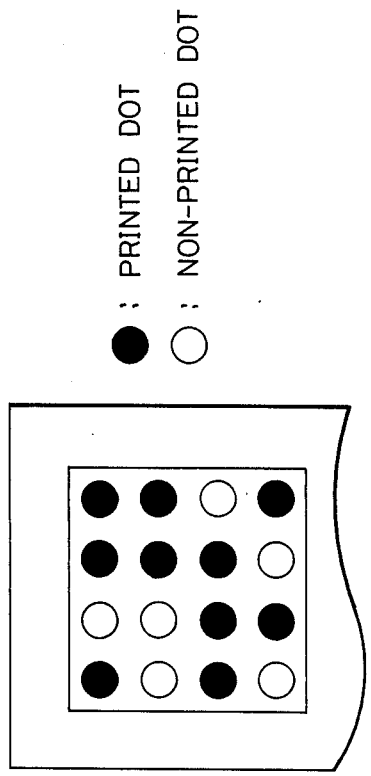

| ADDRESS | DATA |
|---------|------|
| 0000 | 1 |
| 0001 | 1 |
| 0010 | 1 |
| 0011 | 1 |

FIG. 9

| 1 | 3 |
|---|---|
| 4 | 2 |

○ : WRITTEN WITH THRESHOLD VOLTAGE a
△ : WRITTEN WITH THRESHOLD VOLTAGE b
× : WRITTEN WITH THRESHOLD VOLTAGE c
□ : WRITTEN WITH THRESHOLD VOLTAGE d

COLOR HARD COPY APPARATUS HAVING SIMPLIFIED ANALOG-TO-DIGITAL CONVERSION WITH ADJUSTABLE THRESHOLD LEVELS

BACKGROUND OF THE INVENTION (a) Field of the Invention

The present invention relates to a color hard copy apparatus for printing on paper picture data of a picture displayed in a CRT frame connected to a color graphic terminal device. The color hard copy apparatus employs a simplified analog-to-binary data conversion method in order to simplify the video data processing circuits and also to reduce the cost of such color hard copy apparatus.

(b) Description of the Prior Art

Density pattern method and organized dither method are well known for obtaining a multicolor gradation picture on print output paper in a color hard copy system. According to the density pattern method, one picture cell is represented by a 2×2 matrix of subelements, 4×4 matrix of subelements or the like, and all the subelements forming picture cells are represented in either of two binary values (e.g. black or white, light or dark, print or unprint, etc.) to produce a hard copy of the picture. While, according to the organized dither method, a video signal of each picture cell is compared with one of the threshold levels by using an optimum threshold matrix called a dither matrix. Several embodiments for improving the quality of a picture are disclosed in Japanese Patent Laid-Open No. 52969/1984, etc. However, it is very difficult for conventional analog-to-binary data converting methods to effectively deal with video signals of very high frequency like 100 MHz or more being used in recent color graphic displays. In the case of a sequential comparison type analog-to-binary data conversion method, a threshold voltage is varied a number of times at each picture cell, and, therefore, this method can only respond generally to several MHz at best. Some parallel operation type analog-to-binary data conversion methods have a band width covering 100 MHz or above however, when the number of colors to be displayed increases, the number of comparators accordingly has to be increased and the data processing circuits become more complicated, which inevitably results in high cost of such apparatus.

SUMMARY OF THE INVENTION

It is an object of the invention to provide a novel analog-to-binary data conversion method in which an inputted video signal of a picture represented on a CRT display is sampled by a single comparator at predetermined levels of threshold voltages, and a plurality of picture data for the picture obtained at the different threshold levels are stored in a picture memory one by one until analog-to-binary data conversion of the video signal for the picture is completed.

Each threshold level is maintained constant for a predetermined time duration of said video signal (e.g. during each one complete raster scanning of a picture on a CRT display), and the same video signal is sampled at different threshold levels.

Another object of the invention is to provide a color hard copy apparatus employing the abovementioned novel analog-to-binary data conversion method.

BRIEF DESCRIPTION OF THE DRAWINGS

FIG. 6 shows an example of a picture printed according to the density pattern method, FIG. 8 shows an example of the content of a picture memory written therein according to the organized dither method, FIG. 9 shows an example of a 2×2 dither matrix, FIG. 10 illustrates the relationship between a printed picture and memory banks according to the density pattern method.

PREFERRED EMBODIMENT OF THE INVENTION

In order to obtain a multicolor gradation picture according to a density pattern method with the use of the novel analog-to-binary data conversion method, of the present invention an analog video signal of a still picture displayed on a CRT display is converted into binary data by a single comparator. The video signal is sampled at predetermined levels of threshold voltages, and a plurality of picture data for the picture obtained at the different threshold levels are stored in a picture memory one by one until analog-to-binary data conversion of the video signal for the picture at all the different threshold levels is completed.

Each threshold level is maintained constant for a predetermined amount of said video signal (e.g. during scanning of a picture on a CRT frame), and each binary image data taken at different threshold levels is stored separately in a picture memory one by one.

Figure 1:
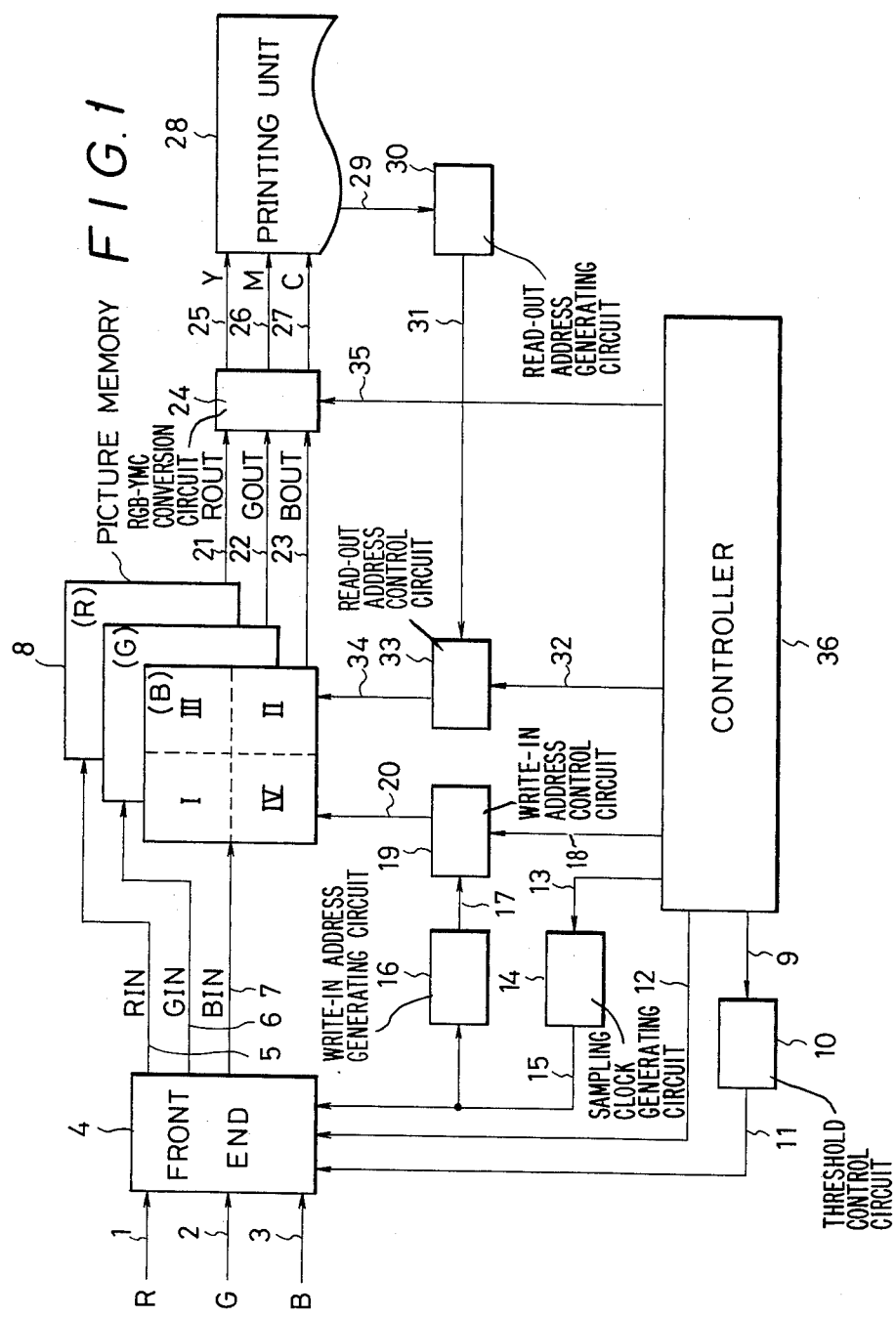
FIG. 1 is a block diagram of a preferred embodiment of the present invention.

For example, when four different levels of threshold voltages are used for sampling the video signal, each binary image data taken at each threshold level is separately written in four banks (e.g., I, II, III and IV in FIG. 1). In the case of a 4×4 matrix of slicing threshold, sixteen different binary image data are written in sixteen banks. The data are read out of these banks one by one and printed to produce a hard copy of the picture. In order to obtain a multicolor gradation picture according to an organized dither method with the use of the novel analog-to-binary data conversion method, a video signal of each picture cell is compared by a single comparator with one of the predetermined threshold voltage levels by using an optimum matrix of thresholds called dither matrix.

Figure 2:
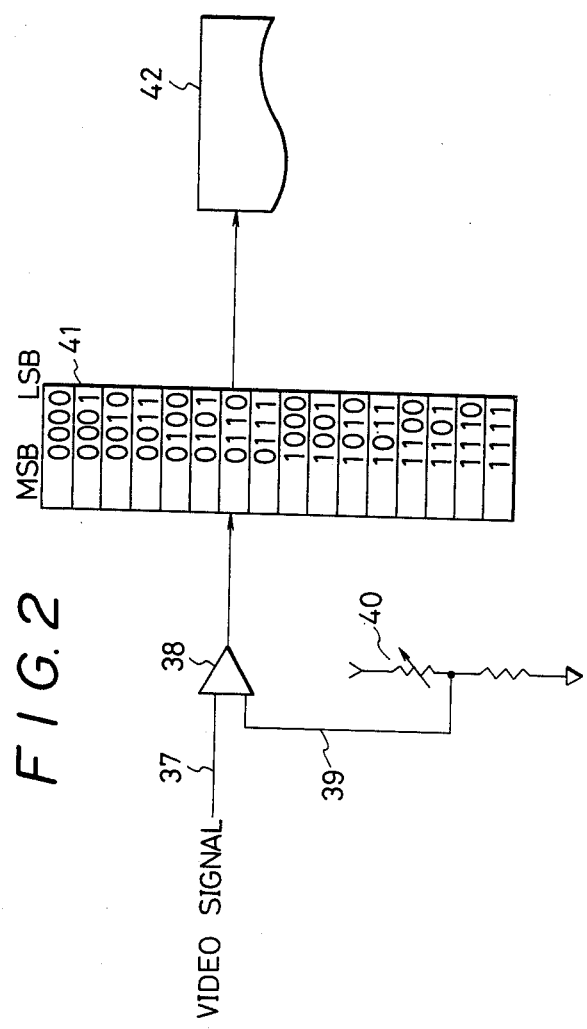
FIG. 2 illustrates the principle of a basic operation of the present invention.
Figures 3, 5:
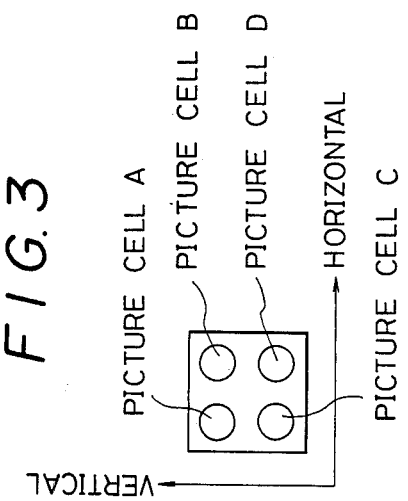
FIG. 3 shows an example of a picture on a CRT display.
FIG. 5 shows an example of the content of a picture memory written therein according to the density pattern method.

For example, when a 2×2 dither matrix of thresholds is used, the video signal of each picture cell is sampled at one of the four different threshold levels according to the dither method. Binary data thus obtained are stored in a picture memory. Each threshold level is maintained at a constant value for a predetermined time duration of said video signal (e.g. during each one complete raster scanning of a picture on a CRT frame), and the same video signal is sampled at different threshold levels according to the dither method. When a 4×4 dither matrix of threshold is used, the video signal is sampled according to the dither method at sixteen different threshold levels and stored in a similar manner as abovementioned. FIG. 2 is a principle diagram illustrating the basic operation of the present invention. In FIG. 2, an analog video signal 37 is inputted to a comparator 38. In order to simplify the explanation of the operation, only four picture cells are assumed to be contained in the video signal. The video signal containing video information of these picture cells is repeated cyclically at every scanning as shown in FIG. 3. The comparator 38 compares the video signal 37 with a threshold voltage 39 and converts the video signal into a binary signal of "1" or "0" according to the level of the video signal and writes it in a picture memory 41 composed of 16 addresses. Numerals in the picture memory 41 show addresses. When printing, a printing unit 42 reads data out of the picture memory 41. Although in this embodiment, a variable volume 40 as shown in FIG. 2 is used to generate the threshold voltage 39, any other devices capable of generating appropriate voltages by an external control may be used instead of the variable volume, and it is not necessary to vary the voltage at high speed.

Figure 4:
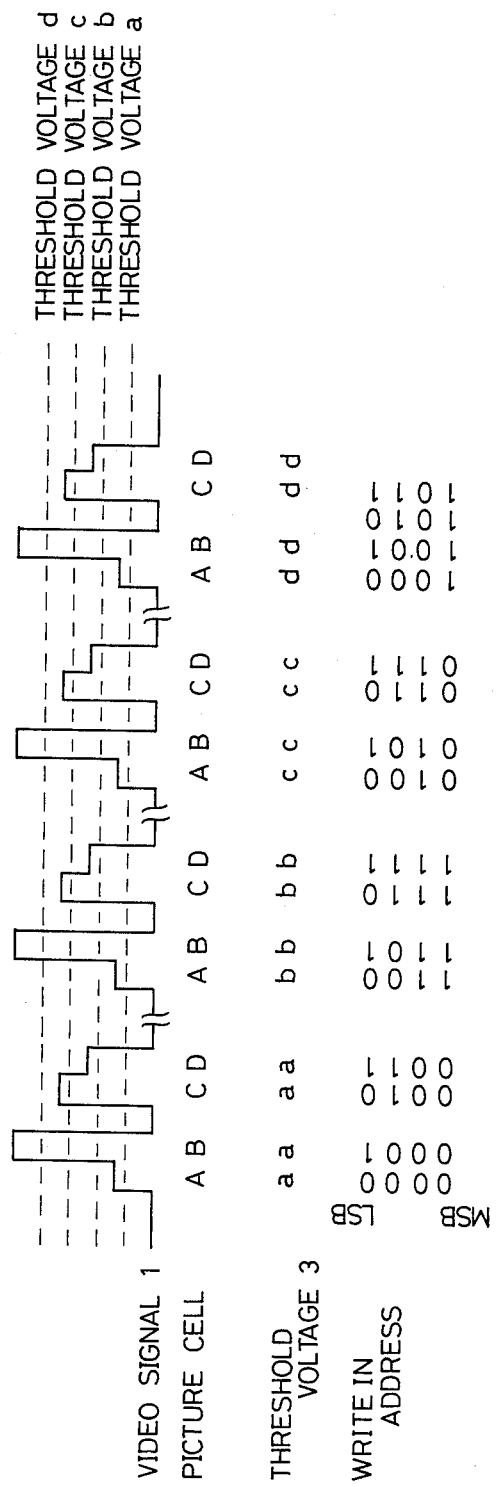
FIG. 4 illustrates an example of writing in a picture memory according to a density pattern method.

In order to obtain a representation by the density pattern method using a 2×2 matrix of subelements to represent one picture cell with an arrangement as shown in FIG. 2, the threshold voltage 39 and a write-in address generated by an address control circuit (not shown) are varied as shown in FIG. 4. Namely, the threshold is maintained at one level, for example, at a for one cycle of the video signal containing video information of the picture cells, e.g., A, B, C and D, and during the next cycle of the video signal at another threshold level b, during the third cycle at c and during the fourth cycle at d while the write-in addresses are changed at every picture cell.

The video signal is sampled as shown in FIG. 4, and the sampled binary data are written in the picture memory 41 as shown in FIG. 5. This means that the writing in the memory is performed with the threshold voltage varied for each bank (defined by the first 2 bits of an address). The data thus written in are read out for printing in the following manner by a read-out address generating circuit (not shown) 0000, 0100, 0001, 0101, line feed, 1000, 1100, 1001, 1101, line feed, 0010, 0110, 0011, line feed, 1010, 1110, 1011, 1111, line feed.

A pattern as shown in FIG. 6 can be obtained by printing in the manner as described above.

Figure 7:
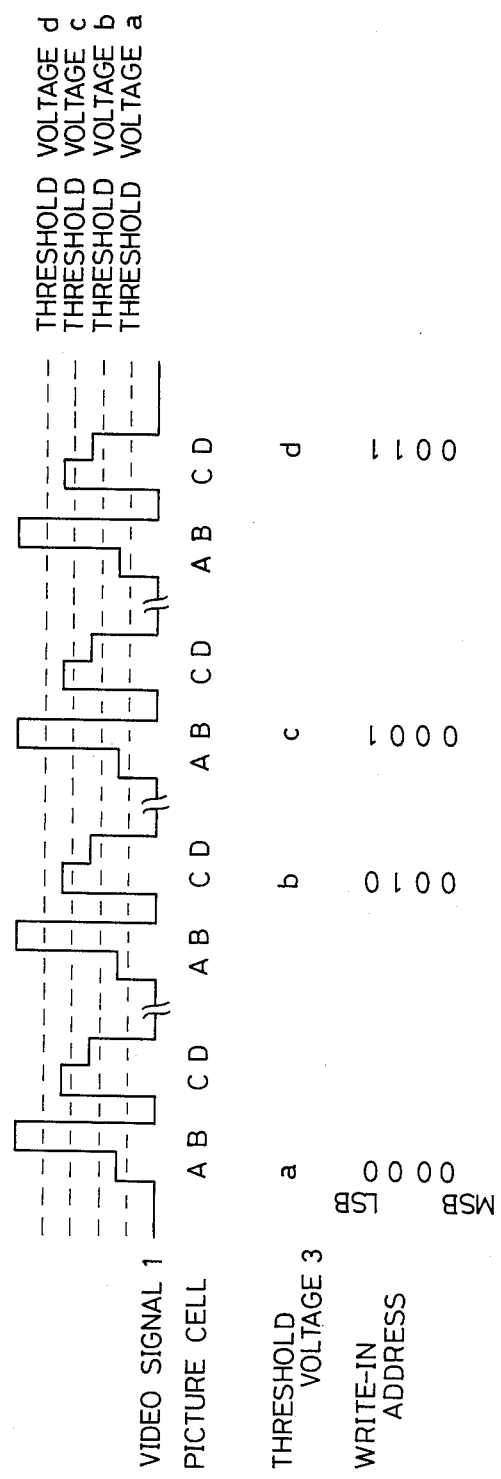
FIG. 7 illustrates an example of writing in a picture memory according to an organized dither method.
Figures 8, 9, 10:
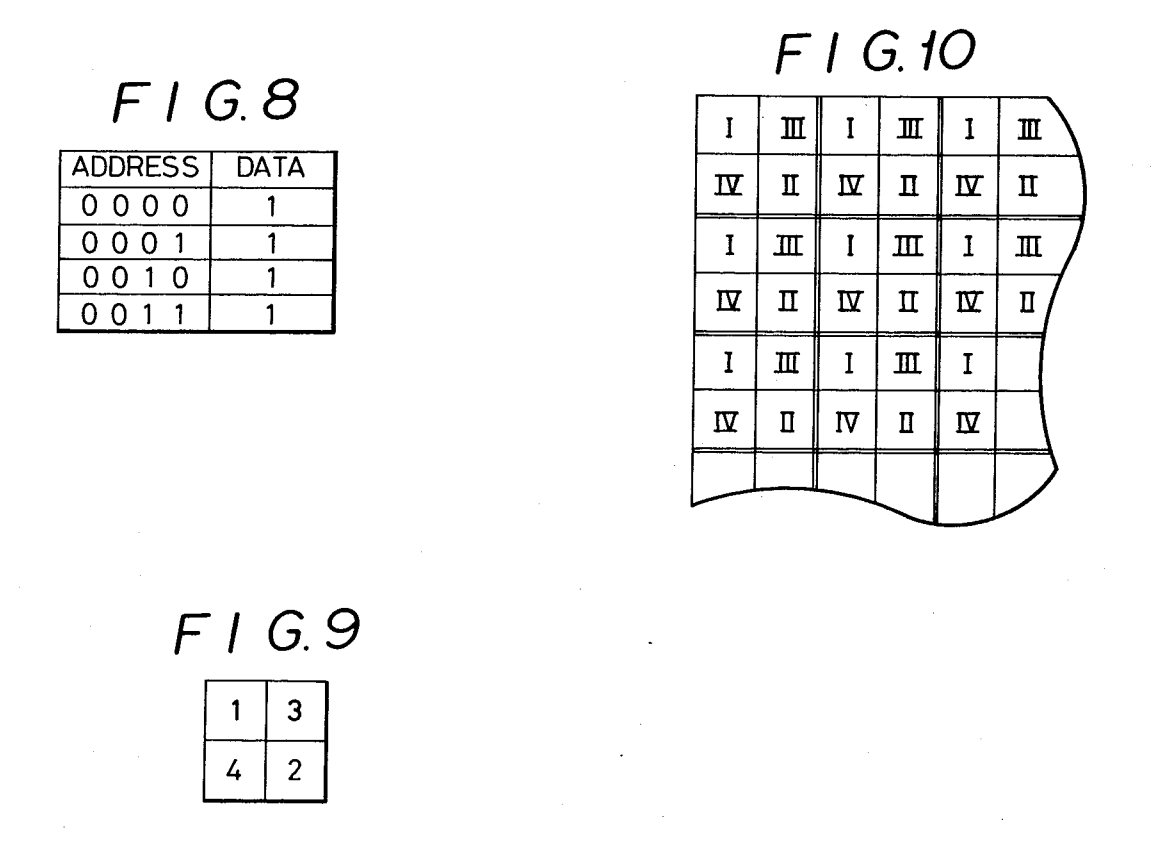

In order to obtain a representation by the organized dither method with the arrangement in FIG. 2, the threshold voltage 37 and addresses generated by the write-in address generating circuit (not shown) are varied as shown in FIG. 7. In this method, each picture cell is sampled at one of the four threshold levels by using an optimum matrix of threshold levels. Each threshold level is maintained at a constant valve during a predetermined time duration of the video signal (e.g. during a raster scanning of a picture on a CRT frame) and the video signal is sampled at four different threshold levels. The binary data of the video signal obtained in the abovementioned manner are stored in a picture memory 41 in the manner as shown in FIG. 8. This means that each picture cell at every address is sampled at one of the four different threshold levels by using a dither matrix of threshold levels. The data thus written in are read out for printing in the following manner by a read-out address generating circuit not shown in the figure: 0000, 0001, line feed, 0010, 0011, line feed Read-out is very simple in this case, as it requires only to read addresses in a low-to-high sequence. FIG. 9 shows a dither matrix employed in this operation, in which the numerals shown in the matrix are four different threshold levels.

Now returning to FIG. 1, an embodiment of the color hard copy apparatus according to the invention is described in detail hereunder. Input signals are composed of video information of the three primary colors of R, G and B, i.e., separate video signals R1, G2 and 3. When a composite video signal such as RS - 170 of EIA is employed, it is necessary only to remove the synchronizing signal therefrom beforehand. When an encoded signal such as NTSC is employed, separate video signals can be obtained easily by decoding.

The video signals R1, G2 and B3 are converted into binary digital signals RIN 5, GIN 6 and BIN 7 at a front end 4 and inputted to a picture memory cell having data storing circuits 8. The threshold voltage 11 for sampling input signals at the front end 4 is generated by a threshold voltage controlling circuit 10 which is controlled by a threshold control signal 9 generated by a controller 36. Differences in peak voltage among R1, G2 and B3 are regulated to adjust white balance on the CRT side in the case of a color graphic display device. In this embodiment, the threshold voltage 11 is regulated finely for each of the RGB signals thereby so that the threshold control signal 9 can produce the same effect as obtained by the white balance regulation.

An RGB select signal 12 for selecting an input RGB signal is generated by the controller 36. A sampling clock signal 15 for conducting sampling at the front end 4 is generated by a sampling clock generating circuit 14. The sampling clock generating circuit 14 generates an appropriate clock clock for sampling R1, G2 and B3 and may be a synchronizing signal for the video signals not shown here or a sampling clock control signal 13 with the use of a PLL circuit or some other relevant means. A write-in address generating circuit 16 is a counter which counts the sampling clock signal 15. Based on an intermediate write-in address 17 (defining addresses of picture cells on a picture) generated from the circuit 16 and a write-in address control signal 18 (defining addresses of banks in a memory) generated from the controller, 36 a write-in address control circuit 19 generates write-in addresse signal 20. When printing is conducted, a printing unit 28 generates a data take-in clock signal 29, and a read-out address generating circuit 30 counts said clock signal 29 and generates an intermediate read-out address signal 31 (defining addresses of picture cells of the picture). Based on the intermediate read-out address signal 31 and a read-out address control signal 32 (defining addresses of banks in the memory), a read-out address control circuit 33 generates a read-out address signal 34 so as to read ROUT 21, GOUT 22, and BOUT 23, which are picture data outputs, out of the picture memory 8. Since printing is conducted generally with the three primary colors of YMC (yellow, magenta, cyan), an RGB/YMC conversion circuit 24 generates picture data Y25, M26 and C27 for printing, based on an RGB/YMC conversion control signal 35 outputted from the controller 36.

The operation of the apparatus is hereunder described in detail. In order to represent a multicolor gradation picture according to the density pattern method, input video signals R1, G2 and B3 are sampled at the lowest level of the threshold voltages and their binary data are written in banks of the picture memory 8. When representation of a picture cell is made by a 2×2 matrix of picture subelements, the binary data of the video signals taken at the lowest threshold level are written, for example, in a bank I of the picture memory 8. The binary data of the video signals taken at the second lowest threshold level are written in a bank II. In this manner, writing is conducted in banks I to IV at different threshold levels from lower threshold level to higher level. When printing, binary data representing binary information of picture subelements are read out of the banks I, II, III and IV to form a pattern as shown in FIG. 10, in which each set of binary data I, II, III and IV forms each picture cell.

Figure 11:
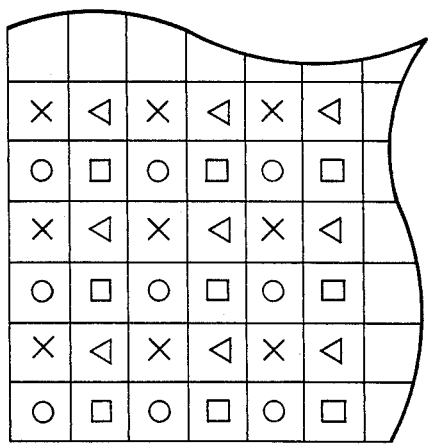
FIG. 11 illustrates an example of sampling according to the organized dither method.

In order to represent the multicolor gradation picture according to the organized dither method, threshold voltage themselves are used as a dither matrix. More specifically, for example, when a 2×2 dither matrix is employed, at each cycle, the video signals consisting of video information of picture cells are sampled at only one level of threshold at a time as shown previously in FIG. 7, and samplings are conducted four times in total at four different threshold levels. In the circuit of FIG. 1, the write-in address control circuit 19 generates the write-in address signal 20 for the picture memory 8 in accordance with the threshold voltage 11 so that said address is arranged to comply with the form of a dither matrix. FIG. 11 shows an example of writing binary data at different threshold levels in addresses. When printing, binary data of picture cells taken at each threshold level laterally and longitudinally appears on alternate rows and lines.

When 16 different threshold levels are used and addresses are generated in a manner of skipping by three, a 4×4 dither matrix is obtained in the same manner. As described hereabove, the novel analog-to-binary data conversion method according to the invention provides simplified data processing circuits to a color hard copy apparatus. Moreover, the apparatus with a single comparator can be used practically for high-speed video signals of 100 MHz or above which are employed in recent color graphic display devices, and at low cost.

What is claimed is:

1. In a color hard copy apparatus which converts an analog video signal of a still picture frame displayed on a color graphic display into binary video data to obtain a multicolor gradation picture: analog-to-digital converting means for sampling an analog video signal having R(red), G(green) and B(blue) signal components representative of a desired picture frame displayed on a color graphic display and converting the analog video signal into corresponding binary video data, the analog-to-digital converting means comprising a single analog-to-digital converter having an adjustably settable threshold level, and means for adjustably setting the threshold level of the analog-to-digital converter to a plurality of different constant threshold levels such that the analog video signal of the entire picture frame is sampled at each different constant threshold level; means for writing the binary video data in a picture memory at predetermined write-in addresses according to a predetermined multicolor gradation picture program; and means for reading the binary video data out of the picture memory according to the predetermined multicolor gradation picture program to obtain binary picture data signals for use in printing a multicolor gradation picture corresponding to the desired picture frame displayed on the color graphic display.

2. A color hard copy apparatus according to claim 1; wherein the analog-to-digital converting means includes means for successively changing the threshold level at which the analog video signal is sampled after completion of the sampling of the entire picture frame at the preceding threshold level until the analog video signal is sampled said plurality of times.

3. A color hard copy apparatus according to claim 1; wherein the means for writing comprises means for successively writing the binary video data obtained at each threshold level in the picture memory one by one.

4. A color hard copy apparatus according to claim 1; wherein the predetermined multicolor gradation picture program comprises a density pattern program.

5. A color hard copy apparatus according to claim 1; wherein the predetermined multicolor gradation program comprises an organized dither program.

* * * * *